(No Model.)
W. QUINN.
BICYCLE.
No. 591,360. Patented Oct. 5, 1897.
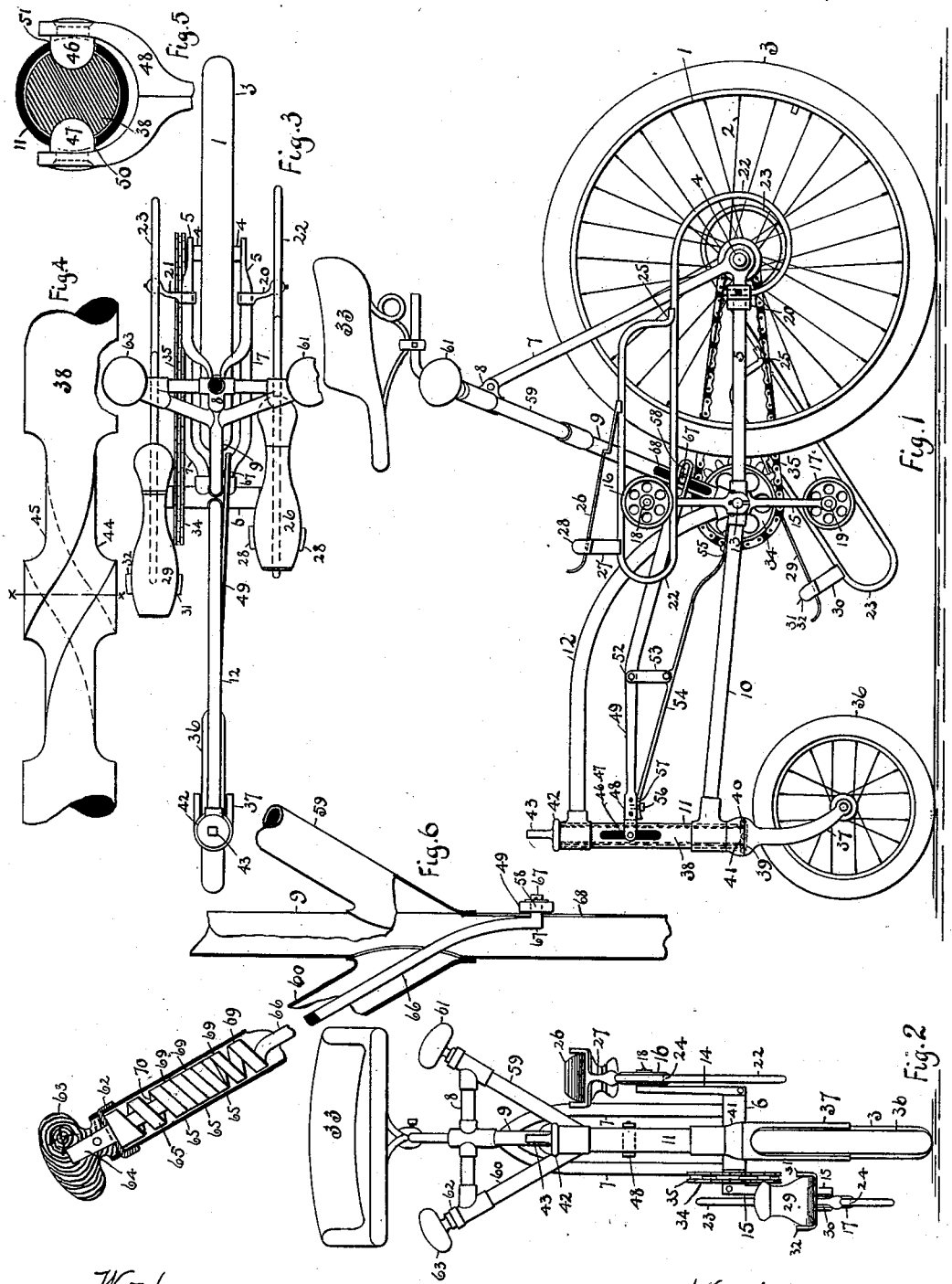
Witnesses
S. J. Murdock
M. W. Wright
Inventor
William Quinn
By R. C. Wright
Attorney

UNITED STATES PATENT OFFICE.

WILLIAM QUINN, OF PHILADELPHIA, PENNSYLVANIA, ASSIGNOR OF ONE-HALF TO LEWIS H. FRENCH, OF SAME PLACE.

BICYCLE.

SPECIFICATION forming part of Letters Patent No. 591,360, dated October 5, 1897.

Application filed October 26, 1896. Serial No. 610,047. (No model.)

*To all whom it may concern:*

Be it known that I, WILLIAM QUINN, a citizen of the United States, residing at Philadelphia, in the county of Philadelphia and State of Pennsylvania, have invented certain new and useful Improvements in Bicycles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My improvements relate to bicycle mechanism in which the rider is seated to maintain an upright position, so that while obtaining needed exercise the body is not bent and its vital organs cramped and injured. I also design to assist the feet when pedaling by providing mechanism to assist in returning the cranks to their most powerful position, and, further, my invention provides a guiding mechanism which, while capable of making quick turns, is normally inclined to move directly forward, except when guided to one side by the rider. I attain these objects by the mechanism illustrated in the following drawings, in which—

Figure 1 is a side elevation. Fig. 2 is a front elevation. Fig. 3 is a plan view. Fig. 4 is a portion of the steering-spindle. Fig. 5 is a section on line $x$ $x$, Fig. 4. Fig. 6 is a section showing steering rod and handle.

Similar reference-characters refer to similar parts throughout the views.

The driving-wheel 1 is the same as is now in general use, having wire spokes 2 and a pneumatic tire 3 and run upon ball-bearings held in suitable seats around its axle 4, all of which are well known and need no further description.

From the axle 4 on each side of the wheel parts 5 of the frame pass forward and are joined to the crank-shaft casing 6, and joined to parts 5 are parts 7 of the frame, which pass obliquely forward and up on each side of wheel 1 and are secured at their upper ends to the saddle and handle-cross 8. Parts 5 and 7 may be rods or pipes, as best suited to the work. From the crank-shaft casing 6 a pipe 9 passes obliquely up and backward, to which is secured the saddle and handle-cross 8, centrally in front of wheel 1.

Other members of the frame are pipe 10, which is attached to crank-shaft casing 6 and leading forward is attached to the lower part of steering-spindle casing 11, and pipe 12, which also joins crank-shaft casing 6, and going forward and upward is also attached to steering-spindle casing 11, but near its upper end both pipes 10 12 being in the central line of the machine. A shaft 13 is inclosed in casing 6 and is also mounted in ball-bearings, as is usual in similar machines, and hence needs no further description.

To the shaft 13 are attached crank-arms 14 15, and at their outer ends they have grooved wheels 16 17, secured by suitable pins 18 19 to the arms 14 15 to permit the wheels 16 17 to freely revolve on the pins.

Attached to the frame members are clamps 20 21, to which are secured the pedal-springs 22 23, which pass downward therefrom at each side of wheel 1, then are spirally turned until they come to a horizontal position above the axle, where they pass forward under the wheels 16 17 and within the groove 24, thence forward to a suitable distance, and doubling back parallel to the lower part pass through the groove 24 and return to the lower part at 25, where a junction is formed with the lower part, thus forming a loop over the wheels. These springs I now prefer to make of round section; but they might perhaps equally well be made of square or rectangular section.

Above pedal-spring 22 I secure a foot-rest 26, having a support 27 near its front end, the support being attached to spring 22, thereafter broadened each way from the center and passing up and by foot-rest 24, forming side guards 28.

Pedal-spring 23 is similarly provided with a foot-rest 29 and a support 30, having side guards 31 32. As the rider, seated in seat 33, pushes down on foot-rest 26, and thereby on support 27 and pedal-spring 22, the power is exerted at the farthest distance from the spring-support 20 and where the rider needs to exert but slight power to overcome the spring 22 when turning the crank 14, its shaft 13, sprocket-wheel 34, chain 35, and wheel 1, while the returning crank 15 is being assisted in its ascent by the pedal-spring 23, nearer to its support 21, and where it exerts its most power in returning its crank 15 to its upper or working position. My mechanism, as described, is designed to cause the motion of the rider's feet to ascend and descend in nearly perpendicular lines, thus more nearly assuming the positions natural in walking, avoiding the usual excessive bending of the knee-joints as developed where the feet are carried on a circular crank, and for women affording a more graceful and modest movement than heretofore possible in the usual machines.

At the front end of my machine I provide a pilot-wheel 36, smaller than the driving-wheel, carried by a fork 37, which is turned backward, putting the wheel 36 behind or trailing from its guiding-point. This is done in pursuit of my purpose to make my machine of its own accord keep directly ahead except when guided to one side. The fork 37 is joined to or made part of a steering-spindle 38, standing vertically within the spindle-casing 11, a cup 39 being formed at its lower part, in which are bearing-balls 40, also seated in inverted cup 41, attached to the lower part of spindle-casing 11. The steering-spindle 38 is guided in its upright position within casing 11, in which it fits snugly but freely. A cap 42 covers casing 11 and has a projection 43, suited to receive and hold a lamp.

The steering-spindle 38 has double and opposite spiral grooves 44 45 at about the center of its length, they being reversed and each passing about half-way around the circumference of spindle 38. Into these spiral grooves 44 45 are fitted projections 46 47, secured to fork 48 of lever 49, the projections passing through slots 50 51, formed in spindle-casing 11. The lever 49 is yieldingly fulcrumed at 52 to a link 53, which connects it to a spring 54, secured to part 10 of frame at 55 and to fork 48 by a connection 56, working in a slot 57. The inner end of the lever passes to one side of pipes 9 10 of the frame and has a slot 58, which is connected to the hand-gear, as will be hereinafter described.

Attached to pipe 9 of frame, about half-way up its length, are diagonal handle-pipes 59 60. A handle 61 is fixed to pipe 59, and to 60 is attached a cap 62, and above the cap 62 is a steering-handle 63, secured to a square stem 64 of the screw 65, which is inside of pipe 60. The threads of the screw may be of double pitch when desired to enable rapid movement. A rod 66 is inserted within pipe 60, the lower end of the rod being turned outward at 67, and passing through a slot 68 is secured to lever 49 in slot 58. At the upper end of rod 66 is a spiral coil 69, exactly fitting in grooves 70 of screw 65, thus acting the same as a nut. The handle 63 being turned, the screw 65 is turned, and as it is held from advancing or receding by cap 62 and handle 63 it moves the spiral coil 69 of rod 66, causing the rod 66 to advance or recede, according to which way the handle 63 is turned, and it also moves lever 49, its fork 48, projections 46 47, turning steering-spindle 38, fork 37, and pilot-wheel 36. The spring 54, attached to lever 49, is for the purpose of keeping lever 49 and its attached projections in grooves 44 45 in normal vertical position when not moved therefrom by the rider, thus keeping the machine straight ahead, as the spring 54 must be deflected when any side movement is made, and its flexible force will thereafter be exerted to resume its normal position and taking with it the attached parts, as aforesaid.

The diagonal pipes 59 60 may be attached lower or higher on pipe 9 than shown and may be placed at a greater angle to put handles 61 63 farther out or in, or may be made longer or shorter to place handles 61 63 higher or lower. The seat or saddle may be of any preferred style, as may also its support.

The handles 61 63, pipes 59 60, and also treadle-springs 22 23 all assist in keeping the skirts of a woman rider from becoming entangled in the driving-wheel. The pitch of the steering-handle screw 65, the location of the fulcrum connection 56, and the pitch of the grooves 44 45 will be of proper proportions to turn the pilot-wheel 36 at a right angle to the center line of the machine upon one turn of the steering-handle 63 if such is found to be most desirable.

Having described the best means I am at the present time aware of for carrying out my invention and without limiting myself to the exact construction of the various parts as shown or their proportions or exact relative positions, I claim—

1. In a bicycle, a driving-wheel and a pilot-wheel therefor somewhat smaller than the driving-wheel, a crank-shaft and cranks, sprocket-wheels and a chain therefor, grooved wheels upon the crank, springs guided in grooves in the periphery of the wheels at their upper and lower sides, and forming a loop for the wheels to run in, and thereafter secured to the framing at their rear end and foot-rests upon the springs, substantially as described.

2. In a bicycle, a driving and a pilot wheel of different diameters, a frame therefor, a crank-shaft supported by the frame and carrying crank-arms and a sprocket-wheel, a sprocket-wheel upon the driving-shaft, a chain connecting the sprocket-wheels, wheels upon the crank-arms said wheels being grooved to receive and move within pedal-springs inclosing them and allowing for their free movement therein while revolving around the axle, coiled ends at the rear and attached ends of the springs, means to attach the springs to the framework and foot-rests upon the springs having side guides, substantially as specified.

3. In a bicycle a framework therefor carrying wheels of different diameters and having a spindle-case normally vertical as its front member, diverging members from its member in front of the driving-wheel whereon is supported the saddle, a spindle within the spindle-case having double spiral grooves, ball-bearings at its lower end, a fork carrying a pilot-wheel back of its central axis, slots within opposite sides of the spindle-case, a fork having means to pass through the slots and engage the spiral grooves, and means to operate the fork for movement of the spindle, substantially as described.

4. In a bicycle, a framework substantially as described, having a front member guiding a spirally-grooved spindle, a middle member upwardly and rearwardly tending in front of the driving-wheel and attached to the crank-shaft casing, diverging frame members attached thereto at their lower end, thereafter tending divergingly upward and outward, joined at their upper part to the frame member in front of the wheel, a fixed handle surmounting one of the diverging members, a steering-handle attached to the other diverging frame member, having therewith connected a screw, a spiral-ended rod embracing said screw and extending downward therefrom within one diverging and the front frame member, and thereafter passing outward through a slot in said front frame member and mechanism connected therewith and to the spiral grooves in the steering-spindle, substantially as described.

5. In a bicycle, a framework therefor carrying a driving-wheel and a pilot-wheel of different diameters, means to pivot the pilot-wheel at the front of the frame to the spindle, back of the spindle center, spiral grooves within the spindle for attaching a fork, means to attach the fork mechanism to a handle supported to the framing at one side of the central line of the machine, in proximity to the saddle and means upon the handle and connected therewith to operate the spindle, substantially as described.

In testimony whereof I affix my signature in presence of two witnesses.

WILLIAM QUINN.

Witnesses:
R. C. WRIGHT,
WILLIAM C. STOEVER.